United States Patent [19]

Takada et al.

[11] 4,304,795

[45] Dec. 8, 1981

[54] PROCESS FOR PREPARING SEMISOLID DRESSING

[75] Inventors: Moritaka Takada, Yokohama; Tateo Murui, Tokyo; Yuko Hanai, Yamato; Hiroshi Kanda, Zushi, all of Japan

[73] Assignee: The Nisshin Oil Mills, Ltd., Tokyo, Japan

[21] Appl. No.: 114,530

[22] Filed: Jan. 23, 1980

[30] Foreign Application Priority Data

Jan. 23, 1979 [JP] Japan ................................. 54-5612

[51] Int. Cl.³ .......................... A23L 1/24; A23D 5/02
[52] U.S. Cl. .................................... 426/602; 426/613; 426/650; 426/656; 426/607
[58] Field of Search .............. 426/602, 613, 656, 650, 426/607

[56] References Cited

U.S. PATENT DOCUMENTS

| | | | |
|---|---|---|---|
| 3,864,500 | 2/1975 | Lynn | 426/613 |
| 3,892,873 | 7/1975 | Kolen | 426/613 |
| 3,968,261 | 7/1976 | Goodman | 426/613 |
| 4,163,808 | 8/1979 | De Paolis | 426/613 |

Primary Examiner—Jeanette M. Hunter
Attorney, Agent, or Firm—Sughrue, Mion, Zinn, Macpeak and Seas

[57] ABSTRACT

A stable semisolid egg yolk-free dressing is obtained by emulsifying an edible oil with an aqueous neutral solution of soybean protein, and lastly mixing vinegar therein.

4 Claims, No Drawings

PROCESS FOR PREPARING SEMISOLID DRESSING

BACKGROUND OF THE INVENTION

This invention relates to a process for preparing a semisolid dressing with use of soybean proteins as an emulsifier.

An increase in cholesterol in blood owing to overeating animal foods has become a serious problem and therefore, the trend of wanting foods free of cholesterol for health is rising yearly. In conventional dressings, egg yolks containing cholesterol are used as an emulsifier. Accordingly, the preparation of dressings using soybean proteins free of cholesterol instead of egg yolks is to just meet the needs of the times.

There have been, hitherto, provided mayonnaise-like foods using soybean proteins, for example, by a method of using a separated soybean protein (Reported at The 5th International Congress of Food Science and Technology, Sept. 17–22, 1978, Kyoto, Japan) or a method of subjecting soybean proteins to lactic fermentation and using the resulting lactic acid instead of vinegar (Japanese Patent Publication No. 51-32705). However, these methods are not sufficiently satisfied for the following reasons.

Soybean proteins have a good emulsifying ability, but they precipitate at a pH range of the isoelectric point because of the solubility being near zero. The conventional dressing (e.g. mayonnaise) is prepared by forming a homogeneous mixture of vinegar and egg yolk as an emulsifier, adding an edible oil and emulsifying same. In case of the egg yolk there is no problem in the emulsifying property at an acidic pH. However, in case of using soybean protein as the emulsifier, 60% or more of the soybean protein is precipitated at a pH range of the isoelectric point, even if the soybean protein is one subjected to a partial hydrolysis with an acid or enzyme to a molecular weight distribution range exhibiting a good emulsifying property. The precipitated soybean protein is extremely reduced in emulsifying ability and no longer acts as an emulsifier.

A pH range of about 4.5 which is the isoelectric point of soybean protein is included in a pH range suitable for dressing. Accordingly, the soybean protein, when mixed with vinegars, is precipitated and therefore, an emulsion of good stability cannot be obtained from a mixture of soybean proteins, vinegars and edible oils even if emulsification is effected using a powerful emulsifier. Thus, it is impossible to prepare good dressings.

SUMMARY OF THE INVENTION

An object of this invention is to provide a process for the preparation of dressings in form of a stable emulsion by using soybean proteins as an emulsifier.

Another object of this invention is to provide a semisolid, vegetable dressing free of cholesterol.

It has been found that soybean proteins exhibit a good emulsifying property at a neutral area and thus, dressings in form of good emulsion are obtained by first emulsifying sufficiently an edible oil with soybean protein and then adding vinegar thereto.

In accordance with this invention, there is provided a process for the preparation of a semisolid dressing which comprises emulsifying an edible oil with an aqueous neutral solution of soybean protein containing condiments, spices and others and then, adding vinegar and mixing together.

DETAILED DESCRIPTION OF THE INVENTION

Soybean proteins which may be used in this invention may be, for example, a separated soybean protein, an extracted soybean protein or a concentrated soybean protein. Soybean proteins of more than 70 in NSI (Nitrogen Solubility Index, measured according to AOAC's method Ba.11-65) are preferred. More preferably, soybean proteins subjected to a partial hydrolysis with an acid or enzyme to increase an emulsifying ability are used. When the NSI is less than 70, the solubility of soybean protein is reduced so that the chewiness becomes worse. The partial hydrolysis with acid or enzyme may be effected in known methods by conventional conditions.

Condiments which may be added in the neutral aqueous solution of soybean protein may be, for example, salt, sodium glutamate, nucleic acid type condiments, natural sweeterners such as sugar, honey or licorice root extracts, yeast extracts and hydrolyzed vegetable proteins. Further, it is preferred that natural gums are dispersed or dissolved in the aqueous solution of soybean protein as an emulsifier assistance. Some kinds of spices, also act as the emulsifier assistance. In some cases, it is advisable that the aqueous solution of soybean protein containing one part of such condiments is preliminarily heated for the purpose of sterilization and then, cooled.

A concentration of the neutral solution of soybean protein is not particularly limited and may be determined depending on the nature of dressings to be desired.

Oil-soluble, natural coloring matters, spices and herbs, tocopherol and others may be preliminarily dissolved in an edible oil.

It is important to maintain the aqueous neutral solution of soybean protein and the edible oil at temperatures below 35° C., preferably below 30° C. prior to mixing and emulsifying and to adjust the temperature so as not to rise during the mixing and emulsifying. When the temperature exceeds 40° C., the emulsification stability is reduced so that separation between oil and water takes place.

The aqueous neutral solution of soybean protein and edible oil are emulsified by means of an emulsifier such as puddle mixer, agitator, Homomixer (the trade name by Tokushukika Kogyo, Japan) or colloid mill alone or in combination thereof.

To the neutral emulsion thus obtained is vinegar added and mixed. Adding of the vinegar should be effected slowly. If the vinegar is added in a rapid speed relative to a stirring speed, deemulsification takes place and therefore, good products cannot be obtained. The emulsion obtained is, preferably, subject to a colloid mill for a further homogenization of particles.

As mentioned above, the requirement indispensable for this invention is to effect the emulsification of an edible oil with a neutral solution of soybean protein prior to the addition of vinegar whereby good dressings with stable emulsion can be prepared notwithstanding that soybean proteins are used as the emulsifier. With other methods good products cannot be prepared. According to this invention, vegetable dressings using soybean proteins as the emulsifier are provided and therefore, there is no need to feel misgivings about cholesterol as opposed to the conventional dressings using egg yolks.

This invention may be further illustrated by the following non-limitative Examples.

EXAMPLE 1

200 g of a separated soybean protein (NSI 80), 100 g of sugar, 200 g of salt and 50 g of a condiment mixture were added to 4.0 l of water and dissolved to form a protein solution. The protein solution obtained was divided into three equal parts and dressings were prepared according to the following three methods.

Sample A:
1.2 kg of soybean salad oil were added slowly to 1.0 kg of the protein solution while maintaining the temperature at 30° C. and emulsified sufficiently. Thereafter 0.2 kg of vinegar were added slowly and further emulsified.

Sample B:
1.2 kg of soybean salad oil and 0.2 kg of vinegar were added slowly to 1.0 kg of the protein solution while maintaining the temperature at 30° C. and emulsification was effected.

Sample C:
0.2 kg of vinegar were added to 1.0 kg of the protein solution and then, 1.2 kg of soybean salad oil were added slowly thereto while maintaining the temperature at 30° C. and emulsification was effected.

These three dressings were observed on the emulsification state. The results are set forth in Table 1.

TABLE 1

| Samples | Emulsification State | Viscosity, cps* |
|---|---|---|
| A | Stable | 50,000 |
| B | Oil separates and rises to the surface. | 25,000 |
| C | Remains separated without emulsifying | 150 |

*According to Brookfield Viscometer

EXAMPLE 2

In accordance with conventional method for a partial hydrolysis with enzyme, a separated soybean protein was subject to a partial hydrolysis with a neutral protease until a solubilization rate of protein by a 10% aqueous solution of trichloroacetic acid had reached 25% by weight and after inactivation of the protease, was spray-dried.

150 g of the separated soybean protein (NSI 98) thus obtained, 100 g of sugar, 200 g of salt, 20 g of sodium glutamate, 2 g of nucleic acid type condiments, 20 g of hydrolyzed vegetable proteins, 11 g of tamarind seed gum and 2.3 l of water were charged into a jacket-equipped tank and dissolved under stirring. The temperature was elevated to 90°–95° C. and maintained for 20 minutes and thereafter, lowered to 30° C.

40 g of essential oil (natural coloring matters) containing carotene which had priviously been extracted from carrot, 5 g of oleoresin and 5 g of tocopherol were dissolved into 5.5 kg of salad oil. The salad oil thus obtained was added to the above protein solution in the tank over five minutes while stirring by means of an impeller type stirrer and then, the stirrer was substituted by Homomixer to effect emulsification. After about 15 minutes' emulsification a viscosity of 80,000 cps was obtained.

Next, the Homomixer was substituted by the impeller type stirrer and 0.6 kg of 100 grains of apple vinegar were added over 10 minutes under stirring, which were then subject to a colloid mill (clearance 250μ) to prepare a semisolid dressing.

The dressing obtained is in form of a good emulsion of 70,000 cps in viscosity and also, no separation between oil and water was observed even after the preservation at 40° C. for one month. Further, the oil separation by a vibration test was less than that of a commercially available mayonnaise (using eggs as an emulsifier).

EXAMPLE 3

A semisolid dressing was prepared in the same manner as in Example 1 except using 200 g of an extracted soybean protein (raw protein 63%, NSI 85) instead of the separated soybean protein.

The dressing obtained was slightly inferior in emulsification state to that of Example 1, but substantially the same as commercially available products (using eggs as an emulsifier).

What is claimed is:

1. In a process for preparing a semi-solid dressing by emulsifying an edible oil and vinegar with an emulsifier, the improvement consisting of the following sequence of steps:
    (a) emulsifying an aqueous neutral solution of soybean protein, as said emulsifier, and all of said edible oil; and then
    (b) mixing vinegar with the emulsified mixture of said edible oil and said aqueous neutral solution of soybean protein.

2. The process of claim 1 wherein the aqueous neutral solution of soybean protein contains condiments, spices and others.

3. The process of claim 1 wherein the soybean protein is one having a Nitrogen Solubility Index of more than 70.

4. The process of claim 1 wherein the soybean protein is one subjected to a partial hydrolysis with an acid or enzyme.

* * * * *